(12) United States Patent
Thomas et al.

(10) Patent No.: US 7,420,507 B2
(45) Date of Patent: Sep. 2, 2008

(54) PHASED ARRAY ANTENNA SYSTEMS WITH CONTROLLABLE ELECTRICAL TILT

(75) Inventors: Louis David Thomas, Malvern (GB); Philip Edward Haskell, Gosport (GB)

(73) Assignee: Qinetiq Limited (GB)

( * ) Notice: Subject to any disclaimer, the term of this patent is extended or adjusted under 35 U.S.C. 154(b) by 60 days.

(21) Appl. No.: 10/577,206

(22) PCT Filed: Oct. 26, 2004

(86) PCT No.: PCT/GB2004/004586

§ 371 (c)(1), (2), (4) Date: Apr. 26, 2006

(87) PCT Pub. No.: WO2005/048401

PCT Pub. Date: May 26, 2005

(65) Prior Publication Data

US 2007/0080886 A1    Apr. 12, 2007

(30) Foreign Application Priority Data

Nov. 7, 2003    (GB) .................... 0325987.6

(51) Int. Cl.
H01Q 3/00 (2006.01)
H04B 15/00 (2006.01)
H04M 1/00 (2006.01)

(52) U.S. Cl. ............. 342/368; 342/372; 455/63.4; 455/562.1

(58) Field of Classification Search ............ 342/368, 342/373, 375–384, 372
See application file for complete search history.

(56) References Cited

U.S. PATENT DOCUMENTS

| 3,255,450 A | 6/1966 | Butler |
| 4,316,192 A | 2/1982 | Acoraci |
| 4,584,581 A | 4/1986 | Teshirogi |

(Continued)

FOREIGN PATENT DOCUMENTS

EP    0 568 886    11/1993

(Continued)

*Primary Examiner*—Thomkas H. Tarcza
*Assistant Examiner*—Harry Liu
(74) *Attorney, Agent, or Firm*—McDonnell Boehnen Hulbert & Berghoff LLP

(57) ABSTRACT

A phased array antenna system with controllable electrical tilt generates two signals V2a and V2b with variable relative delay therebetween. The signals are converted into antenna element drive signals by a power distribution network. The network splits each of the two signals V2a and V2b into three signal components. Pairs of components of different signals are input respective hybrid coupling devices (hybrids), which provide vector sums and differences of their inputs and act as phase-to-power converters. Their outputs are distributed between further hybrids, which act as power-to-phase converters and provide antenna element drive signals with phase varying both with element array position and also with the variable relative delay between the two signals V2a and V2b. Antenna electrical tilt is therefore controllable by altering a single relative delay.

20 Claims, 12 Drawing Sheets

U.S. PATENT DOCUMENTS

| | | | |
|---|---|---|---|
| 5,757,634 A * | 5/1998 | Ferens | 363/72 |
| 6,268,828 B1 | 7/2001 | Martek | |
| 2004/0209572 A1* | 10/2004 | Thomas | 455/63.4 |
| 2004/0252055 A1* | 12/2004 | Thomas et al. | 342/372 |
| 2005/0012665 A1* | 1/2005 | Runyon et al. | 342/372 |
| 2006/0003808 A1* | 1/2006 | Haskell et al. | 455/562.1 |
| 2006/0192711 A1* | 8/2006 | Haskell | 342/372 |
| 2006/0208944 A1* | 9/2006 | Haskell | 342/368 |

FOREIGN PATENT DOCUMENTS

| | | |
|---|---|---|
| GB | 2 158 649 | 11/1985 |
| WO | WO 02/082581 | 11/2002 |
| WO | WO 03/036756 | 5/2003 |
| WO | WO 03/043127 | 5/2003 |
| WO | WO 2004/088790 | 11/2004 |
| WO | WO 2004/102739 | 11/2004 |

\* cited by examiner

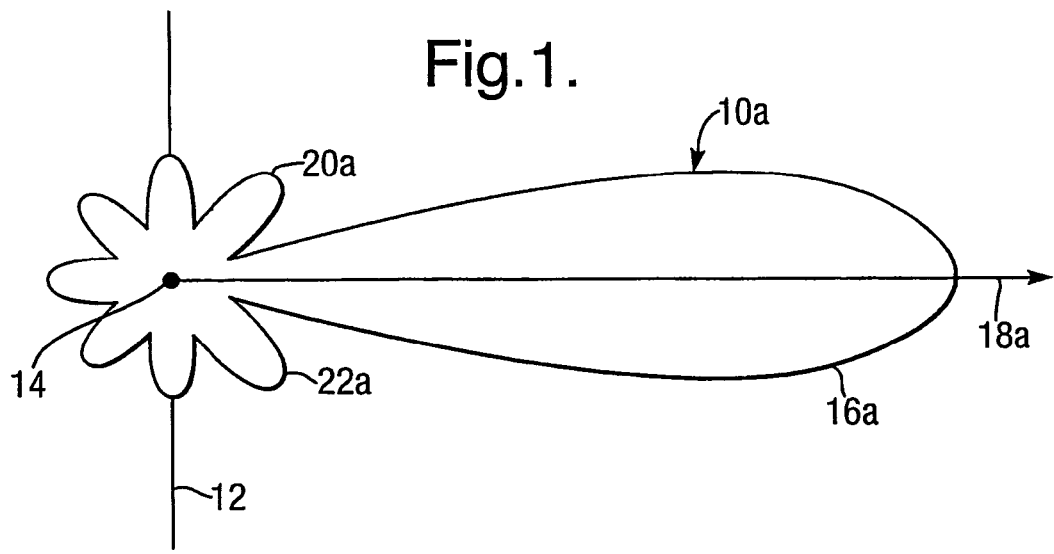
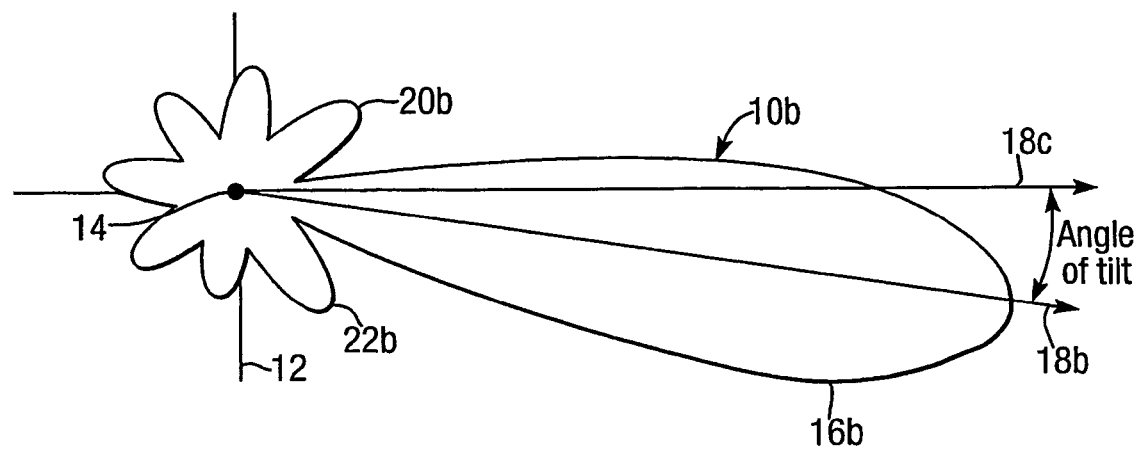
Fig.1.

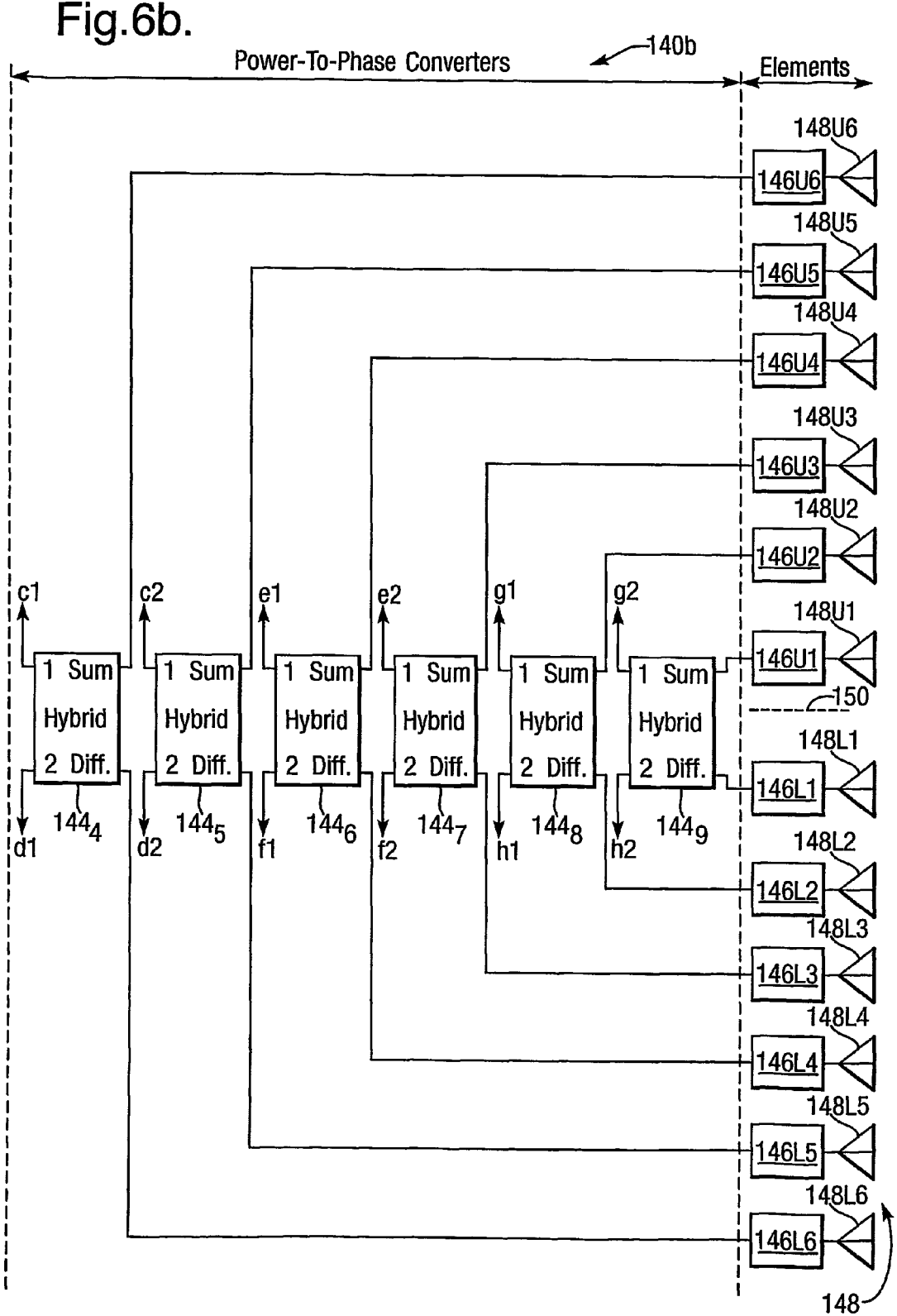

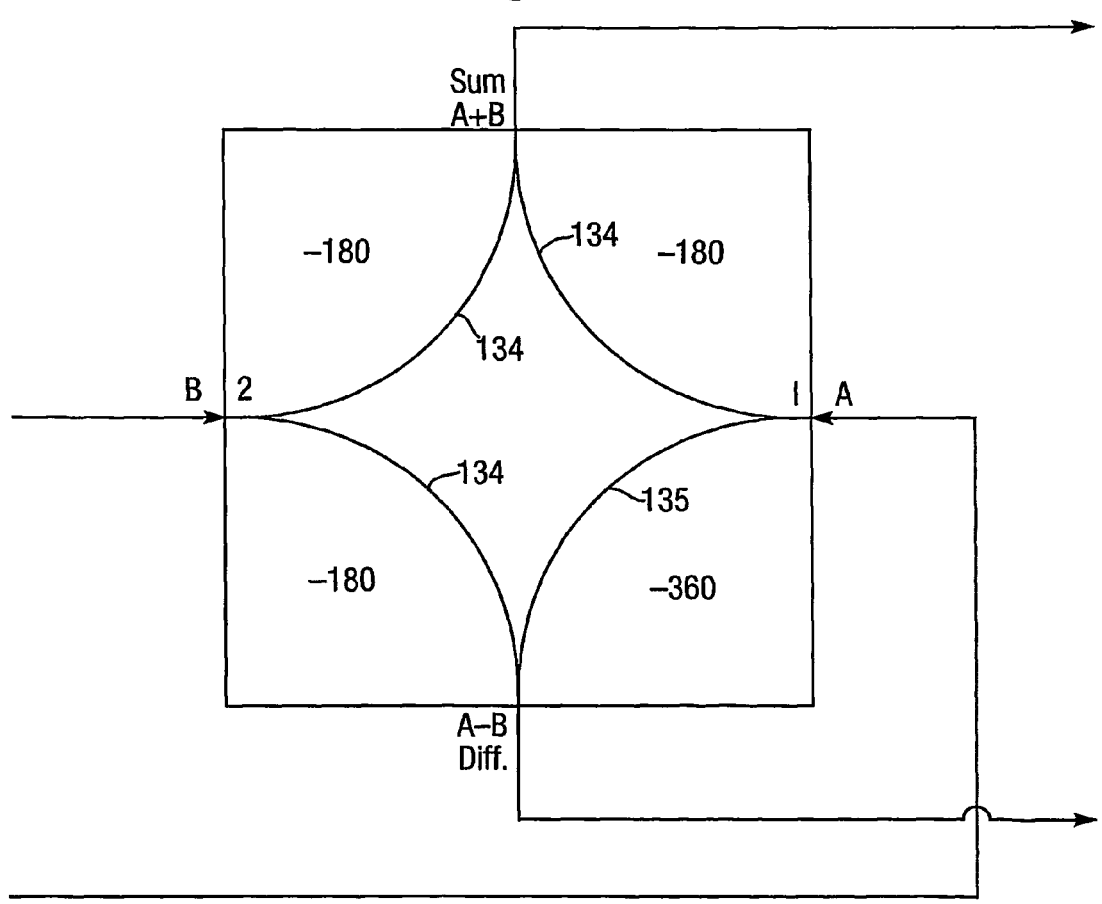

Sinusoidal curves

PHASED ARRAY ANTENNA SYSTEMS WITH CONTROLLABLE ELECTRICAL TILT

BACKGROUND OF THE INVENTION (1) Field of the Invention

The present invention relates to a phased array antenna system with controllable electrical tilt. The antenna system is suitable for use in many telecommunications systems, but finds particular application in cellular mobile radio networks, commonly referred to as mobile telephone networks. More specifically, but without limitation, the antenna system of the invention may be used with second generation (2G) mobile telephone networks such as the GSM system, CDMA (IS95), D-AMPS (IS136) and PCS systems and third generation (3G) mobile telephone networks such as the Universal Mobile Telephone System (UMTS), and other cellular systems.

(2) Description of the Art

Operators of cellular mobile radio networks generally employ their own base-stations, each of which has at least one antenna. In a cellular mobile radio network, the antennas are a primary factor in defining a coverage area in which communication to the base station can take place. The coverage area is generally divided into a number of cells, each associated with a respective antenna and base station.

Each cell contains a base station for radio communication with all of the mobile radios (mobiles) in that cell. Base stations are interconnected by other means of communication, usually fixed land-lines, or point-to-point radio links, allowing mobile radios throughout the cell coverage area to communicate with each other as well as with the public telephone network outside the cellular mobile radio network.

Cellular mobile radio networks which use phased array antennas are known: such an antenna comprises an array (usually eight or more) individual antenna elements such as dipoles or patches. The antenna has a radiation pattern incorporating a main lobe and sidelobes. The centre of the main lobe is the antenna's direction of maximum sensitivity in reception mode and the direction of its main output radiation beam in transmission mode. It is a well-known property of a phased array antenna that if signals received by antenna elements are delayed by a delay which varies with element distance from an edge of the array, then the antenna main radiation beam is steered towards the direction of increasing delay. The angle between main radiation beam centres corresponding to zero and non-zero variation in delay, i.e. the angle of tilt, depends on the rate of change of delay with distance across the array.

Delay may be implemented equivalently by changing signal phase, hence the expression phased array. The main beam of the antenna pattern can therefore be altered by adjusting the phase relationship between signals fed to antenna elements. This allows the beam to be steered to modify the coverage area of the antenna.

Operators of phased array antennas in cellular mobile radio networks have a requirement to adjust their antennas' vertical radiation pattern, i.e. the pattern's cross-section in the vertical plane. This is necessary to alter the vertical angle of the antenna's main beam, also known as the "tilt", in order to adjust the coverage area of the antenna. Such adjustment may be required, for example, to compensate for change in cellular network structure or number of base stations or antennas. Adjustment of antenna angle of tilt is known both mechanically and electrically, either individually or in combination.

Antenna angle of tilt may be adjusted mechanically by moving antenna elements or their housing (radome): it is referred to as adjusting the angle of "mechanical tilt". As described earlier, antenna angle of tilt may be adjusted electrically by changing time delay or phase of signals fed to or received from each antenna array element (or group of elements) without physical movement: this is referred to as adjusting the angle of "electrical tilt". When used in a cellular mobile radio network, a phased array antenna's vertical radiation pattern (VRP) has a number of significant requirements:
1. high boresight gain;
2. a first upper side lobe level sufficiently low to avoid interference to mobiles using a base station in a different cell;
3. a first lower side lobe level sufficiently high to allow communications in the immediate vicinity of the antenna;
4. side lobe levels that remain within predetermined limits when the antenna is electrically tilted.

The requirements are mutually conflicting, for example, increasing the boresight gain may increase the level of the side lobes. Also, the direction and level of the side lobes may change when the antenna is electrically tilted.

A first upper side lobe maximum level, relative to the boresight level, of −18 dB has been found to provide a convenient compromise in overall system performance.

The effect of adjusting either the angle of mechanical tilt or the angle of electrical tilt is to reposition the boresight so that, for an array lying in a vertical plane, it points either above r below the horizontal plane, and hence changes the coverage area of the antenna. It is desirable to be able to vary both the mechanical tilt and the electrical tilt of a cellular radio base station's antenna: this allows maximum flexibility in optimisation of cell coverage, since these forms of tilt have different effects on antenna ground coverage and also on other antennas in the station's immediate vicinity. Also, operational efficiency is improved if the angle of electrical tilt can be adjusted remotely from the antenna assembly. Whereas an antenna's angle of mechanical tilt may be adjusted by re-positioning its radome, changing its angle of electrical tilt requires additional electronic circuitry which increases antenna cost and complexity. Furthermore, if a single antenna is shared between a number of operators it is preferable to provide a different angle of electrical tilt for each operator.

The need for an individual angle of electrical tilt from a shared antenna has hitherto resulted in compromises in the performance of the antenna. The boresight gain will decrease in proportion to the cosine of the angle of tilt due to a reduction in the effective aperture of the antenna (this is unavoidable and happens in all antenna designs). Further reductions in boresight gain may result as a consequence of the method used to change the angle of tilt.

R. C. Johnson, Antenna Engineers Handbook, 3rd Ed 1993, McGraw Hill, ISBN 0-07-032381-X, Ch 20, FIG. 20-2 discloses a known method for locally or remotely adjusting a phased array antenna's angle of electrical tilt. In this method a radio frequency (RF) transmitter carrier signal is fed to the antenna and distributed to the antenna's radiating elements. Each antenna element has a respective phase shifter associated with it so that signal phase can be adjusted as a function of distance across the antenna to vary the antenna's angle of electrical tilt. The distribution of power to antenna elements when the antenna is not tilted is proportioned so as to set the side lobe level and boresight gain. Optimum control of the angle of tilt is obtained when the phase front is controlled for all angles of tilt so that the side lobe level is not increased over the tilt range. The angle of electrical tilt can be adjusted remotely, if required, by using a servo-mechanism to control the phase shifters.

This prior art method antenna has a number of disadvantages. A phase shifter is required for every antenna element. The cost of the antenna is high due to the number of phase shifters required. Cost reduction by applying delay devices to respective groups of antenna elements instead of to individual elements increases the side lobe level. Mechanical coupling of delay devices is used to adjust delays, but it is difficult to do this correctly; moreover, mechanical links and gears are required resulting in a non-optimum distribution of delays. The upper side lobe level increases when the antenna is tilted downwards thus causing a potential source of interference to mobiles using other cells. If the antenna is shared by a number of operators, the operators have a common angle of electrical tilt instead of different angles. Finally, if the antenna is used in a communications system having (as is common) up-link and down-link at different frequencies (frequency division duplex system), the angles of electrical tilt in transmit and receive modes are different.

Patent Application Nos. PCT/GB2002/004166, PCT/GB2002/004930, GB0307558.7 and GB0311371.9 describe different approaches to locally or remotely adjusting an antenna's angle of electrical tilt by means of a phase difference between two signals fed to antenna circuitry. PCT/GB2004/001297 relates to adjusting electrical tilt by dividing a carrier signal into two signals, variably phase shifting one signal relative to the other and applying a phase to power conversion to the resulting signals. The converted signals are split and subjected to power to phase conversion for supply to antenna elements. Electrical tilt is adjusted by varying the phase shift between the two signals. PCT/GB2004/002016 also relates to introducing a variable relative phase shift between two signals, which are then split into components: vectorial combinations of the components are formed to provide respective drive signals for individual antenna elements. Here again electrical tilt is adjusted by varying the phase shift between the two signals.

There is however a problem concerned with splitting RF signals, in that splitter ratios can be too high to be implemented in a single splitting operation: it may require two or more cascaded operations which increases circuit size, cost and complexity. The reason for this lies in the fact that splitters are implemented by dividing a microstrip track on a circuit board into narrower strips with different impedance compared to the track before division. Microstrip impedance is related to track width by a highly complicated and empirical expression, but for a typical board substrate thickness a 50 Ohm track would be 2.8 mm wide. The track narrows as the impedance is increased until it is too narrow for a reliable bond to the substrate Failure to produce a reliable bond occurs at track widths below about 0.2 mm: this width gives an impedance of about 150 Ohms, representing a splitter ratio of 9.5 dB, which it is therefore desirable not to exceed for a single splitter.

PCT/GB2004/001297 requires splitter ratios of 19 dB, which means cascading at least two splitter operations.

Other potential problems are as follows: a) too many splitter outputs may be required than can be implemented in a single splitter; b) widely varying splitter ratios reduce the frequency range over which an antenna can tilt while retaining a desirable low side lobe level; and c) multiple splitters result in a corporate signal feed network to an antenna with different feeder lengths to individual antenna elements. Of these c) requires additional components to be inserted so that the signal transit time to each element is the same to obtain a phase neutral network and an optimised frequency response. All of these problems make it desirable to reduce the number of splitters and the splitter ratios.

SUMMARY OF THE INVENTION

It is an object of the present invention to provide an alternative form of phased array antenna system.

The present invention provides a phased array antenna system with controllable electrical tilt including an antenna with multiple antenna elements, characterised in that the system has:
  a) means for providing two basis signals with variable relative delay therebetween,
  b) splitting means for dividing the basis signals into signal components,
  c) phase to power converting means for converting the signal components into transformed components having powers which vary as the relative delay varies, and
  d) power to phase converting means for converting the transformed components into antenna element drive signals having phases which vary from antenna element to antenna element progressively across the antenna when the antenna is electrically tilted and which individually vary as the relative delay varies.

The invention provides the advantage that it allows electrical tilt to be controlled with a single variable relative delay, although a plurality of delays may be used if required to increase obtainable range of electrical tilt, and it requires relatively few splitting operations.

The phase to power converting means may be a plurality of hybrid radio frequency coupling devices ("hybrids") arranged to provide sums and differences of pairs of signal components, each pair having signal components from both basis signals. It may be a plurality of 180 degree hybrids arranged to provide sums and differences of pairs of signal components, each pair having signal components from both basis signals. Each pair may have signal components of equal magnitude, with each pair's component magnitude not being equal to that of another pair.

The hybrids may be first hybrids and the power to phase converting means may incorporate a plurality of second hybrids arranged to generate the antenna element drive signals. The splitting means may be a first splitting means and the power to phase converting means may incorporate a second splitting means arranged to divide the sums and differences into components for input to the second hybrids. The first splitting means may be arranged to divide each of the basis signals into three signal components. The second splitting means may be a plurality of two-way splitters.

In a preferred embodiment, the invention is arranged such that all paths for basis signals to antenna elements contain the same numbers and types of components.

In another aspect, the present invention provides a method of controlling electrical tilt of a phased array antenna system including an antenna with multiple antenna elements, characterised in that the method incorporates the steps of:
  a) providing two basis signals with variable relative delay therebetween,
  b) dividing the basis signals into signal components,
  c) converting the signal components into transformed components having powers which vary as the relative delay varies, and
  d) converting the transformed components into antenna element drive signals having phases which vary from antenna element to antenna element progressively across the antenna when the antenna is electrically tilted and which individually vary as the relative delay varies.

The method aspect of the invention may incorporate preferred features equivalent mutatis mutandis to those of the antenna system aspect.

DESCRIPTION OF THE FIGURES

In order that the invention might be more fully understood, embodiments thereof will now be described, by way of example only, with reference to the accompanying drawings, in which:

FIG. 1 shows a phased array antenna's vertical radiation pattern (VRP) with zero and non-zero angles of electrical tilt;

FIGS. 6a and 6b show a power distribution network for use in a system of the invention having a twelve-element antenna;

FIG. 7 is a schematic diagram of a 180 degree hybrid RF coupling device used in the FIGS. 5 and 6 networks;

DETAILED DESCRIPTION OF THE INVENTION

Figure 2:
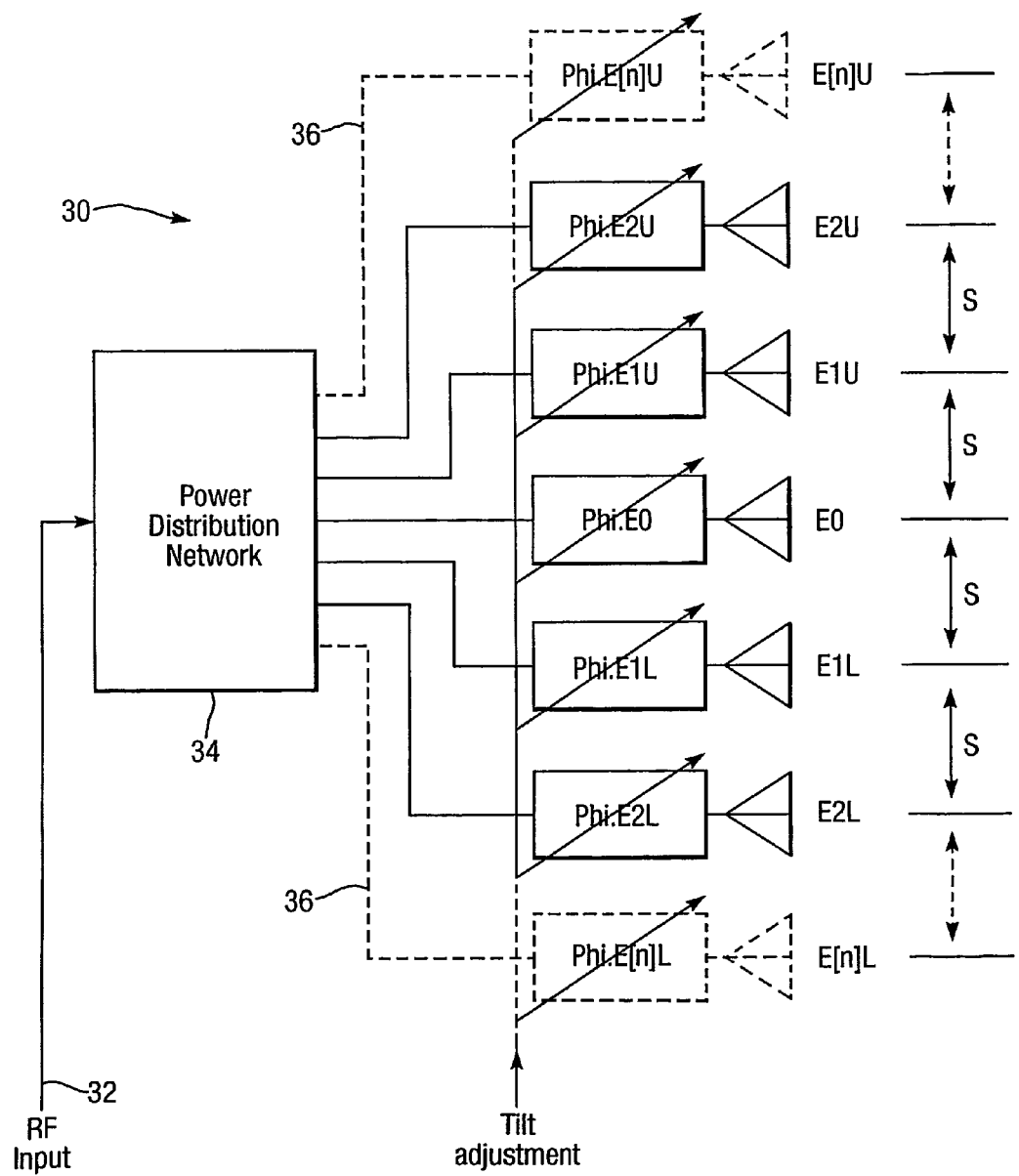
FIG. 2 illustrates a prior art phased array antenna having an adjustable angle of electrical tilt.

Referring to FIG. 1, there are shown vertical radiation patterns (VRP) 10a and 10b of an antenna 12 which is a phased array of individual antenna elements (not shown). The antenna 12 is planar, has a centre 14 and extends perpendicular to the plane of the drawing. The VRPs 10a and 10b correspond respectively to zero and non-zero variation in delay or phase of antenna element signals with array element distance across the antenna 12 from an array edge. They have respective main lobes 16a, 16b with centre lines or "boresights" 18a, 18b, first upper sidelobes 20a, 20b and first lower sidelobes 22a, 22b; 18c indicates the boresight direction for zero variation in delay for comparison with the non-zero equivalent 18b. When referred to without the suffix a or b, e.g. sidelobe 20, either of the relevant pair of elements is being referred to without distinction. The VRP 10b is tilted (downwards as illustrated) relative to VRP 10a, i.e. there is an angle—the angle of tilt—between main beam centre lines 18b and 18c which has a magnitude dependent on the rate at which delay varies with distance across the antenna 12.

The VRP has to satisfy a number of criteria: a) high boresight gain; b) the first upper side lobe 20 should be at a level low enough to avoid causing interference to mobiles using another cell; c) the first lower side lobe 22 should be at a level sufficient for communications to be possible in the antenna 12's immediately vicinity; and d) the level and direction of the side lobes should remain within predetermined design limits when the antenna is electrically tilted. These requirements are mutually conflicting, for example, maximising boresight gain may increase the side lobes 20, 22. Relative to a boresight level (length of main beam 16), a first upper side lobe maximum level of −18 dB has been found to provide a convenient compromise in overall system performance. Boresight gain decreases in proportion to the cosine of the angle of tilt due to reduction in the antenna's effective aperture. Further reductions in boresight gain may result depending on how the angle of tilt is changed.

The effect of adjusting either the angle of mechanical tilt or the angle of electrical tilt is to reposition the boresight so that it points either above or below the horizontal plane, and hence adjust the coverage area of the antenna. For maximum flexibility of use, a cellular radio base station preferably has available both mechanical tilt and electrical tilt since each has a different effect on ground coverage and also on other antennas in the immediate vicinity. It is also convenient if an antenna's electrical tilt can be adjusted remotely from the antenna. Furthermore, if a single antenna is shared between a number of operators, it is preferable to provide a different angle of electrical tilt for each operator, although this compromises antenna performance in the prior art.

Referring now to FIG. 2, a prior art phased array antenna system 30 is shown in which the angle of electrical tilt is adjustable. The system 30 incorporates an input 32 for a radio frequency (RF) transmitter carrier signal, the input being connected to a power distribution network 34. The network 34 is connected via phase shifters Phi.E0, Phi.E1L to Phi.E[n]L and Phi.E1U to Phi.E[n]U to respective radiating antenna elements E0, E1L to E[n]L and E1U to E[n]U of the phased array antenna system 30: here suffix U indicates upper and suffix L indicates lower, n is an arbitrary positive integer which defines phased array size, and dotted lines such as 36 indicating the relevant element may be replicated or removed as required for any desired array size.

The phased array antenna system 30 operates as follows. An RF transmitter carrier signal is fed to the power distribution network 34 via the input 32: the network 34 divides this signal (not necessarily equally) between the phase shifters Phi.E0, Phi.E1L to Phi.E[n]L and Phi.E1U to Phi.E[n]U, which phase shift their respective divided signals and pass them on with phase shifts to associated antenna elements E0, E1L to E[n]L, E1U to E[n]U respectively. The phase shifts are chosen to select an appropriate angle of electrical tilt. The distribution of power between the antenna elements E0 etc. when the angle of tilt is zero is chosen to set the side lobe level and boresight gain appropriately. Optimum control of the angle of electrical tilt is obtained when the phase front across the array of elements E0 etc. is controlled for all angles of tilt so that the side lobe level is not increased significantly over the tilt range. The angle of electrical tilt can be adjusted remotely, if required, by using a servo-mechanism to control the phase shifters Phi.E0, Phi.E1L to Phi.E[n]L and Phi.E1U to Phi.E[n]U, which may be mechanically actuated.

The phased array antenna system 30 has a number of disadvantages as follows:

a) a phase shifter is required for each antenna element, or (less advantageously) per group of elements;

b) the cost of the antenna is high due to the number of phase shifters required;

c) cost reduction by applying phase shifters to respective groups of elements instead of to individual antenna elements increases the side lobe level;

d) mechanical coupling of phase shifters to set delays correctly is difficult and mechanical links and gears are used which result in a non-optimum delay scheme;

e) the upper side lobe level increases when the antenna is tilted downwards causing a potential source of interference to mobiles using other base stations;

f) if an antenna is shared by different operators, all must use the same angle of electrical tilt; and g) in a system with up-link and down-link at different frequencies (frequency division duplex system), the angle of electrical tilt in transmit is different from that in receive.

Figure 3:
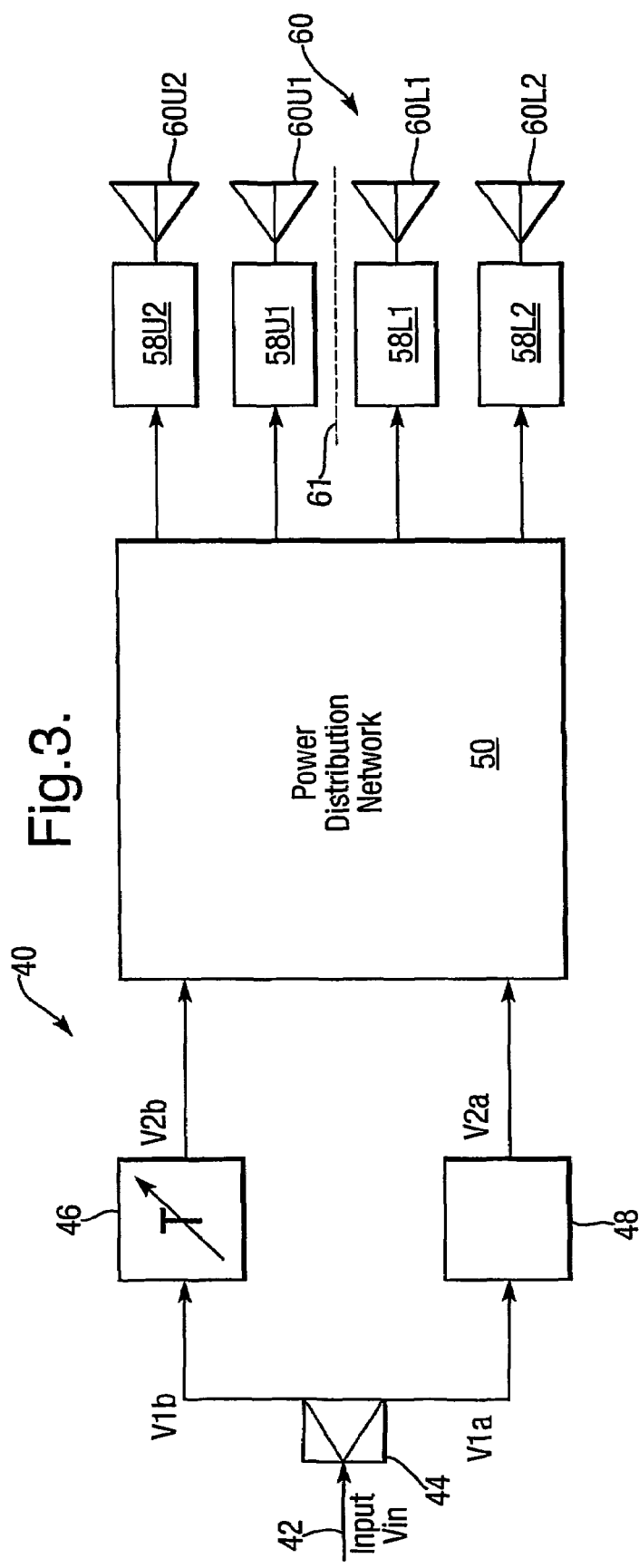
FIG. 3 is a block diagram of a phased array antenna system of the invention using a single time delay.

Referring now to FIG. 3, a phased array antenna system 40 of the invention is shown which has an adjustable angle of electrical tilt. The system 40 has an input 42 for an RF transmitter carrier signal: the input 42 is connected to a power splitter 44 providing two output signals V1*a*, V1*b* which are input signals to a variable phase shifter 46 and a fixed phase shifter 48 respectively. The phase shifters 46 and 48 may also be considered as time delays, as phase shift and time delay are equivalent at a single frequency. They provide respective output signals V2*a* and V2*b* to a power distribution network 50, which will be described in more detail later.

The network 50 provides four drive signals which pass via fixed phase shifters 58U1, 58U2, 58L1 and 58L2 to four equispaced antenna elements 60U1, 60U2, 60L1 and 60L2 (U=upper, L=lower) respectively of a phased array antenna 60. The antenna 60 has a centre indicated by a dotted line 61. The antenna 60 could have any number of elements so long as it has at least two elements.

The phased array antenna system 40 operates as follows. An RF transmitter carrier signal is fed (single feeder) via the input 42 to the power splitter 44 where it is divided into signals V1*a* and V1*b* of equal power. The signals V1*a* and V1*b* are fed to the variable and fixed phase shifters 46 and 48 respectively. The variable phase shifter 46 is controlled by an operator to apply selectable phase shift or time delay, and the degree of phase shift applied here controls the angle of electrical tilt of the phased array antenna 60. The fixed phase shifter 48 (which is convenient but not essential) applies a fixed phase shift which for convenience is arranged to be half the maximum phase shift $\phi_M$ applicable by the variable phase shifter 46. This allows V1*a* to be variable in phase in the range $-\phi_M/2$ to $+\phi_M/2$ relative to V1*b*, and these signals after phase shift become V2*a* and V2*b* as has been said after output from the phase shifters 46 and 48.

From its input signals V2*a* and V2*b*, the network 50 forms a variety of vectorial combinations of signals to provide a respective drive signal for each antenna element 60U1 etc. The drive signals vary in phase linearly (or perhaps with a contoured phase taper) as a function of antenna element distance across the antenna 60 from an antenna element 60U2 or 60L2 at one edge, as required to produce a parallel beam from the antenna 60 inclined at an angle to the array boresight. As is well known in the art of phased arrays, the angle depends on the rate of change of phase with distance across the antenna 60. It can be shown (as described later) that the angle of electrical tilt of the array 60 is variable simply by using one variable phase shifter, the variable phase shifter 46. This compares with the FIG. 2 prior art requirement to have multiple variable phase shifters, a respective phase shifter for each antenna element. When the phase difference introduced by the variable phase shifter 46 is positive the electrical tilt is in one direction, and when that phase difference is negative the electrical tilt is in the opposite direction.

The fixed phase shifters 58U1 etc. impose fixed phase shifts, which, between different antenna elements 60U1 etc., vary linearly (ignoring phase taper) according to element geometrical position across the array 60: this is to set a zero reference direction (18*a* or 18*b* in FIG. 1) for the array 60 boresight when the phase difference between the signals V1*a* and V1*b* imposed by the variable phase shifter 46 is zero. The fixed phase shifters 58U1 etc. are not essential, but they are preferred because they can be used to a) proportion correctly the phase shift introduced by the tilt process, b) optimise suppression of side lobes over the tilt range, and c) introduce an optional fixed angle of electrical tilt.

If there are a number of users, each user may have a respective phased array antenna system 40. Alternatively, if it is required that the users employ a common antenna 60, then each user has a respective set of elements 42 to 50 in FIG. 3, and a combining network is required to combine signals for feeding to the antenna array 60. Published International Patent Application No. WO 02/082581 A2 describes such a network.

Figure 4:
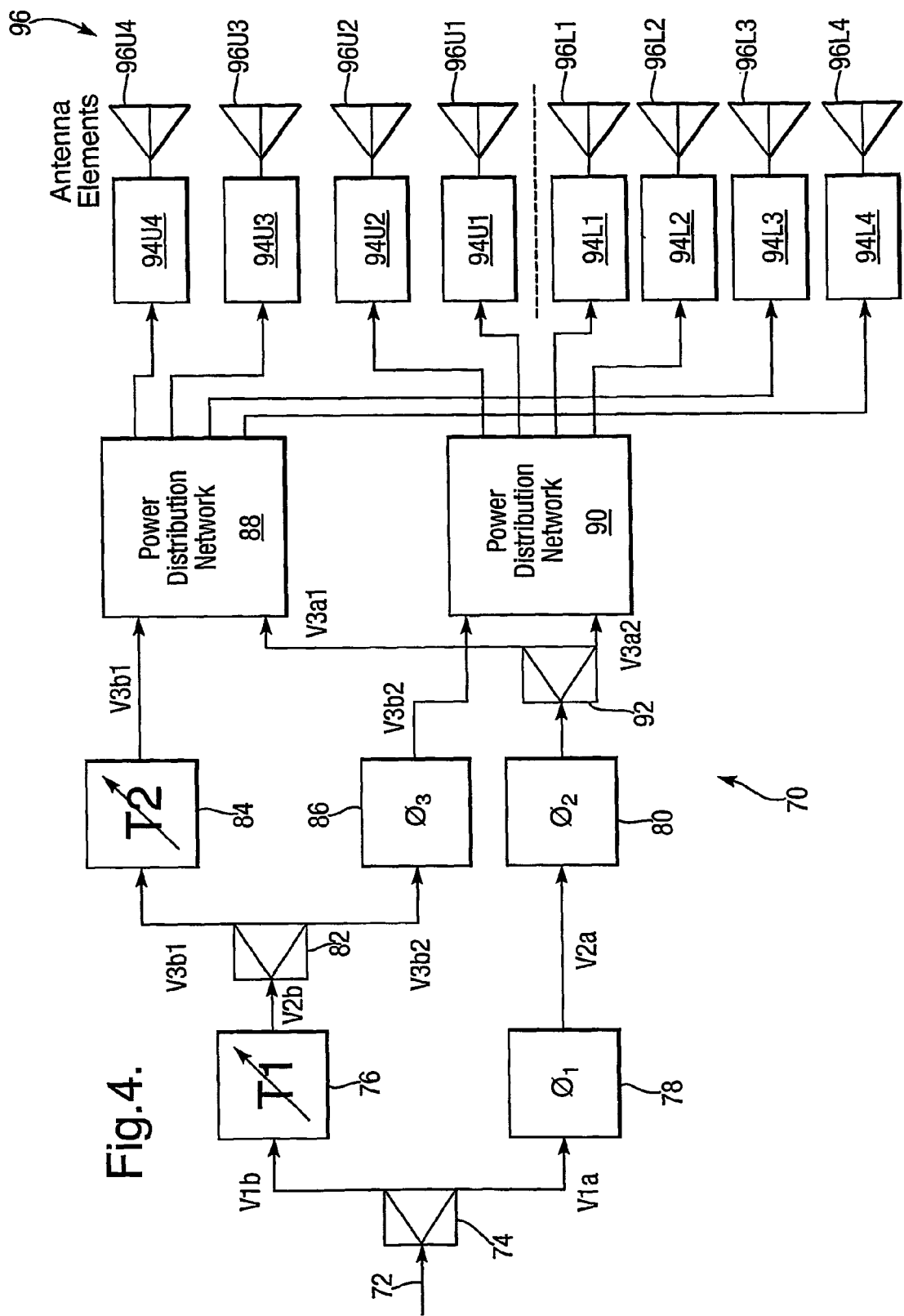
FIG. 4 is a block diagram of a phased array antenna system of the invention using two time delays.

Referring now to FIG. 4, this drawing shows a further phased array antenna system 70 of the invention using two time delays or phase shifts. The system 70 has an RF carrier signal input 72 connected to a first power splitter 74, which provides two output signals V1*a*, V1*b* for input to a first variable phase shifter 76 and a first fixed phase shifter 78 respectively. They provide respective output signals V2*a* and V2*b* to a second fixed phase shifter 80 and a second power splitter 82. The first and second fixed phase shifters 78 and. 80 may be combined into a single unit if required. The second power splitter 82 divides signal V2*b* into two signals V3*b*1 and V3*b*2, which pass to a second variable phase shifter 84 and a third fixed phase shifter 86. The signals V3*b*1 and V3*b*2 then pass to first and second power distribution networks 88 and 90 respectively, which will be described in more detail later. Signal V2*a* passes via the second fixed phase shifter 82 to a third power splitter 92 for division into two signals V3*a*1 and V3*a*2 fed to the first and second power distribution networks 88 and 90 respectively.

The networks 88 and 90 collectively provide eight drive signals which pass via fixed phase shifters 94U1 to 94L4 to eight equispaced antenna elements 96U1 to 96L4 respectively of a phased array antenna 96. Network 90 drives the innermost four antenna elements 96U1, 96U2, 96L1 and 96L2 and network 88 drives the remainder.

The phased array antenna system 70 operates as follows. An RF transmitter carrier signal is fed (single feeder) via the input 72 to the first power splitter 74 where it is divided into signals V1*a* and V1*b* of equal power. The signals V1*a* and V1*b* are fed to the first variable and fixed phase shifters 76 and 78 respectively. The fixed phase shifter 78 applies a phase shift of half the maximum phase shift applicable by the variable phase shifter 76. The first variable phase shifter 76 provides part of the control of the angle of electrical tilt of the phased array antenna 96, the second variable phase shifter 76 providing the rest of this control.

The power distribution networks 88 and 90 receive input signals V3*a*1/V3*b*1 and V3*a*2/V3*b*2 respectively, and they form vectorial combinations of these signals to provide a respective drive signal for each antenna element 96U1 etc. The drive signals vary in phase linearly as a function of antenna element distance across the antenna 96. The use of two variable phase shifters 76 and 84 allows a greater range of phase shift to be applied across the antenna 96 than a single phase variable phase shifter (as in FIG. 3), and thus a greater range of electrical tilt is obtainable.

Figure 5:
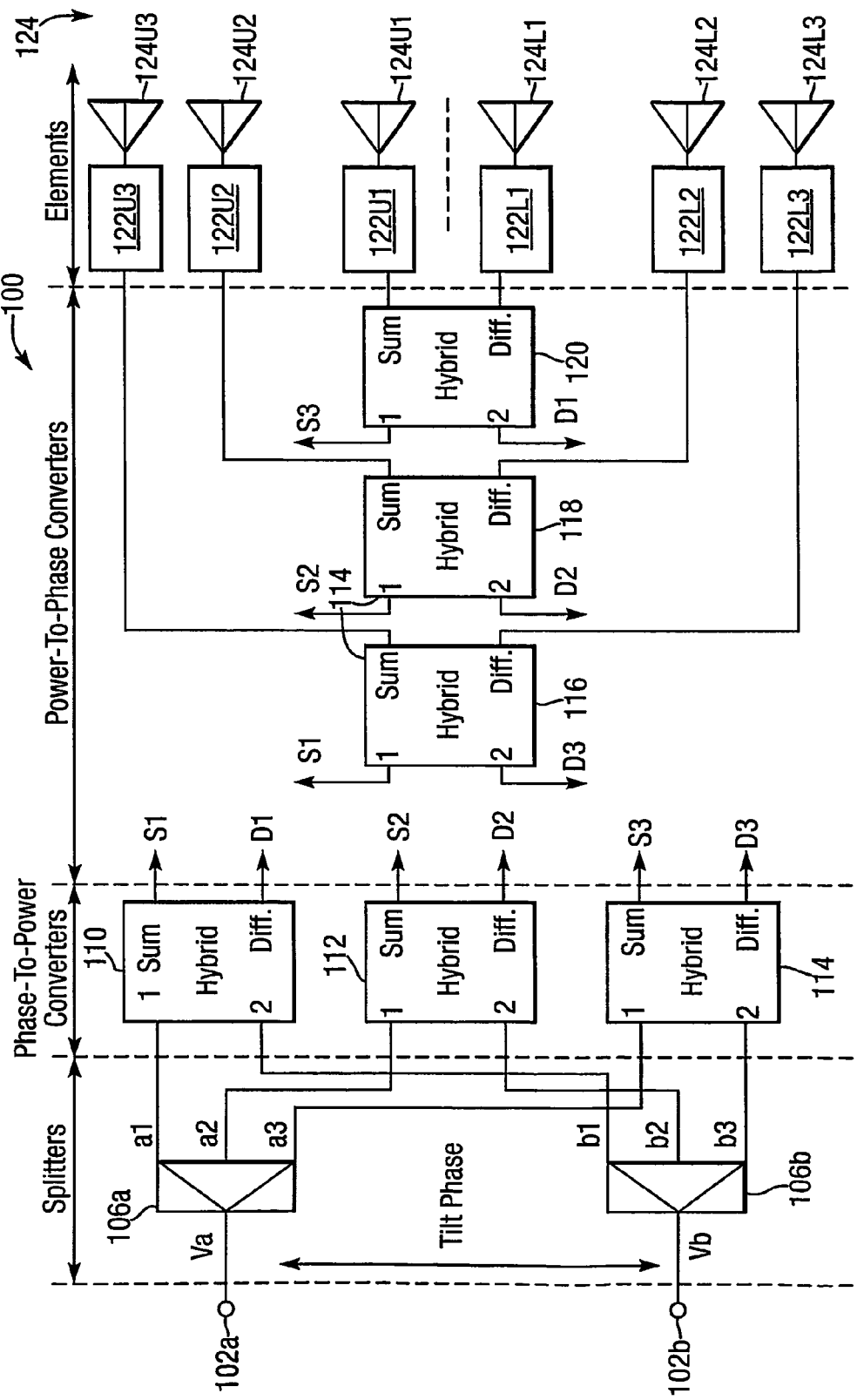
FIG. 5 shows a power distribution network for use in the system of FIG. 3 or 4.

Referring now to FIG. 5, a power distribution network 100 is shown which is generally of the kind used at 50, 88 and 90 in FIGS. 3 and 4, albeit it is shown with more antenna elements than are associated with equivalents described earlier. The network 100 has two inputs 102*a* and 102*b* connected to first and second three-way power splitters 106*a* and 106*b* respectively. The first three-way power splitter 106*a* divides an input signal or vector A with amplitude Va into three signals a1.A, a2.A and a3.A, where a1, a2 and a3 are scalar amplitude splitting ratios. The signals a1.A, a2.A and a3.A are fed to first inputs 1 of first, second and third 180 hybrid RF signal coupling devices (hybrids) 110, 112 and 114 respectively. The second three-way power splitter 106b divides an input signal or vector B with amplitude Vb into three signals b1.B, b2.B and b3.B, where b1, b2 and b3 are scalar amplitude splitting ratios of the second splitter 106b. The three signals b1.B, b2.B and b3.B are fed to second inputs 2 of the hybrids 110, 112 and 114 respectively. The amplitudes of vectors A and B are equal, that is Va=Vb. The hybrids 110 to 114 are also known as sum and difference hybrids.

Each of the hybrids 110, 112 and 114 has sum and difference outputs S1/D1, S2/D2 and S3/D3 respectively at which are the vector sum A+B and difference A−B of its input signals A and B. As will be described later in more detail, it is a property of such hybrids that their sum and difference outputs have a fixed phase difference of 90 degrees between them when the amplitudes of their input signals are equal. This is the case even if the phase difference between these input signals varies. The A+B sum signals are in phase with one another, as are the A−B difference signals, and the sum signals are at 90 degrees to the difference signals. As the phase difference between the input signals varies, due to operation of the variable phase shifter 46, the sum and difference output signals vary in magnitude: e.g. with in-phase input signals of equal magnitude, A+B=2A and A−B=0; with input signals of equal magnitude in antiphase, A+B=0 and A−B=2A; with input signals of equal magnitude differing in phase by 90 degrees, A+B and A−B are both equal to $\sqrt{A^2+B^2}$. The hybrids 110, 112 and 114 therefore act as phase-to-power converters, because they convert input signals with constant power but variable phase difference to output signals with variable power but constant phase difference.

The A+B sum signals from outputs S1, S2 and S3 of the hybrids 110, 112 and 114 are fed to correspondingly referenced inputs S1, S2 and S3 of fourth, fifth and sixth 180 hybrids 116, 118 and 120 respectively. Similarly, the A−B difference signals from outputs D1, D2 and D3 of the hybrids 110, 112 and 114 are fed to correspondingly referenced inputs D1, D2 and D3 of the sixth, fifth and fourth hybrids 120, 118 and 116 respectively.

The fourth, fifth and sixth hybrids 116 to 120 also have sum and difference outputs indicated in each case by Sum and Diff. at which the vector sum A+B and difference A−B of their input signals appear respectively. The A+B sum signals are fed via respective fixed phase shifters 122U1 to 122U3 to respective antenna elements 124U1 to 124U3 in an upper half of a six element phased array antenna 124. Similarly, the A−B difference signals are fed via fixed phase shifters 122L1 to 122L3 to respective antenna elements 124L1 to 124L3 in a lower half of the antenna 124. Strictly speaking, the phase shifters 122U1 to 122L3 and antenna array 124 are not part of the network 100 because FIGS. 3 and 4 which incorporate the network already show equivalents of these. The fourth, fifth and sixth hybrids 116 to 120 convert power differences between their inputs into phase differences at their outputs, so they act as power-to-phase converters.

Further flexibility exists in setting the required phase and amplitude to each antenna element 124L1 etc. if further splitters are inserted between the outputs of first, second and third hybrids 110 to 114 and the inputs of fourth, fifth and sixth hybrids 116 to 120. In order to avoid the need to dissipate power other than in the antenna elements, whenever an output of first, second or third hybrid 110, 112 or 114 is split, then further hybrids and antenna elements are added so as to use all RF power as efficiently as possible.

The antennas element 124U1 etc. are associated with respective fixed phase shifters 122U1 etc. whose purpose is to a) set the nominal mean tilt of the antenna and b) optimise the level of the lobes of the antenna 124 over its tilt range.

In FIG. 5 the hybrids 110 to 120 are shown with equal weighting applied to their inputs: i.e. with input signals A and B then the sum output is (A+B) and the difference output is (A−B). However, they may also be constructed with unequally weighted inputs A and B to give a sum output (xA+yB), and a difference output (xA−yB). Here x is a weighting applied to input A and y is a weighting applied to input B. To conserve power in an unequally weighted hybrid, the total power entering its inputs should be equal to the total power flowing out of its outputs, ignoring unavoidable thermal losses in a practical implementation. Two advantages result from the use of an unequally weighted hybrid: a) further flexibility is added to the design in optimising antenna element phase and amplitude distributions; b) signal splitting may be distributed between two or more splitter components thus reducing the maximum splitting ratio required of any one splitter and improving frequency response.

When used in the system 40, the advantages of the power distribution network 100 are:
  a) only one splitting operation is required at splitters 106a and 106b, each of which splits into only three signals;
  b) tilt is implemented with a single variable phase shifter or time delay device 46;.
  c) the signals at the network inputs 102a and 102b and components into which they become converted pass through exactly the same number and types of components along paths to antenna elements 124U1 etc., i.e. one splitter and two hybrids (as has been said strictly speaking the phase shifters 122U1 etc. are not part of the network 100). These paths should therefore have substantially the same electrical length ignoring variation due non-zero manufacturing tolerances. Hence, phase and amplitude errors in the network due to different types of components in different paths are avoided and good beam shape is retainable over the tilt range. Furthermore, the beam shape is retained over a wider range of frequencies since the phase and amplitude errors of each path to an element vary equally and reduce the error between adjacent antenna elements;
  c) the antenna can be implemented without the need to dissipate RF power in any component other than antenna elements, ignoring departure of components from ideal properties;
  d) the cost of a phased array antenna is reduced compared with an antenna of a comparable performance using multiple variable time delay devices; and
  e) the reliability of the antenna is not compromised by the use of a large number of variable time delay devices.

Splitters may be inserted between outputs of the first three hybrids 110 to 114 and the inputs of the other hybrids 116 to 120 so as to introduce further flexibility in setting phase and amplitude of signals fed to antenna elements. This will be described in the next embodiment.

Figure 6A:
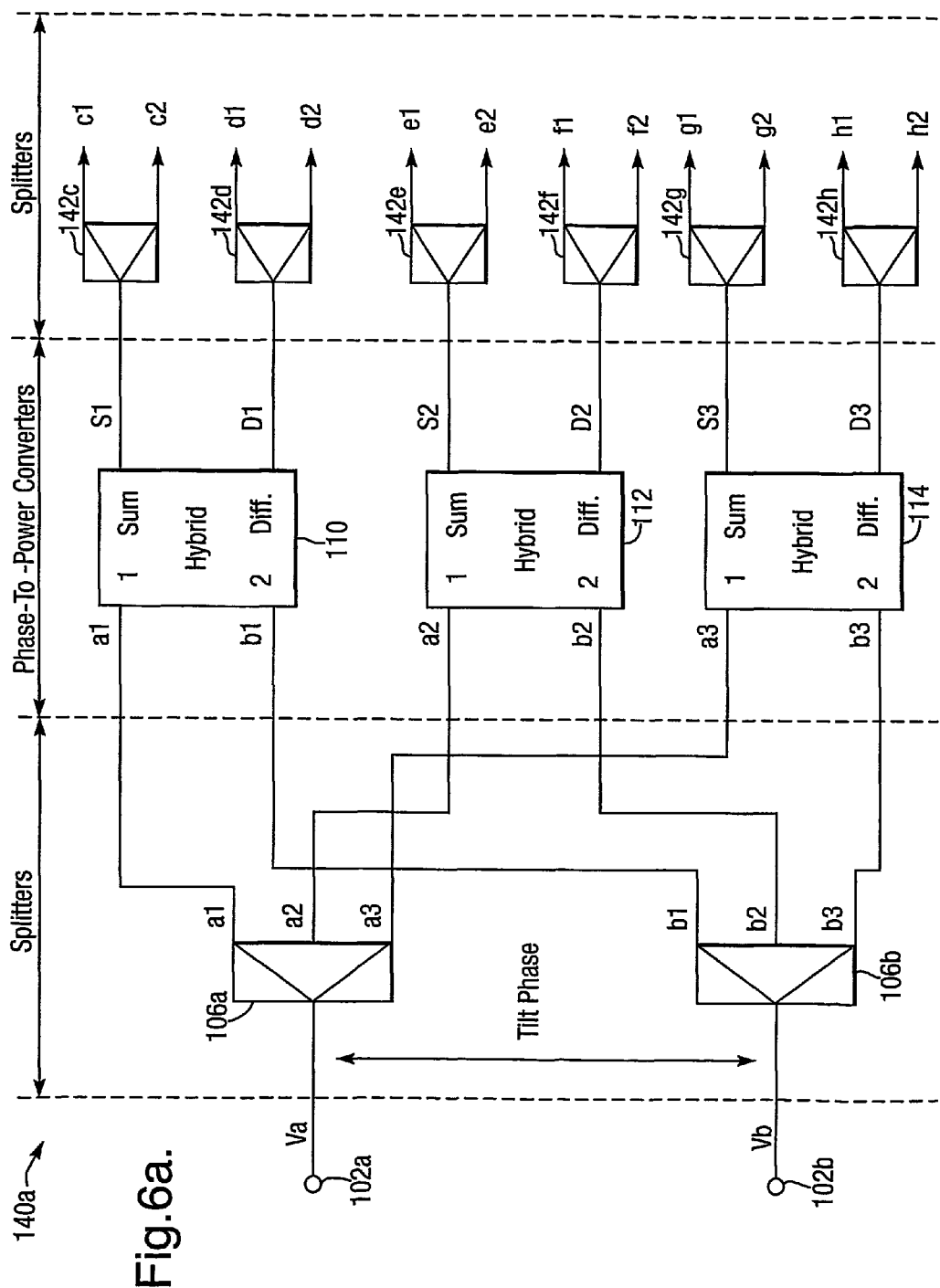

Referring now to FIGS. 6a and 6b, a further power distribution network 140 is shown in two sections 140a and 140b: the network 140 is for use with an equispaced twelve-element phased array antenna 148 but in other respects of the kind used at 50, 88 and 90 in FIGS. 3 and 4. The network 140 is equivalent to that described with reference to FIG. 5 with an extra column of splitters 142c to 142h and sufficient hybrids $144_4$ to $144_9$ and fixed phase shifters 146U1 to 144L6 to provide signals for an increased number of antenna elements 148U1 to 148L6 of the antenna 148. Parts equivalent to those described earlier are like-referenced and the description will concentrate on aspects of difference.

As before, two input signal vectors A and B, having respective amplitudes Va and Vb, at inputs 102a and 102b are split into signal fractions a1.A, a2.A, a3.A and b1.B, b2.B, b3.B by splitters 106a and 106b and fed to first and second inputs 1 and 2 of first, second and third hybrids 110 to 114: i.e. signals a[n+1]A+b[n+1]B are input to nth hybrid 110+2n, n=0, 1 and 2. The splitting ratios are set so that a1=b1, a2=b2 and a3=b3 in order to implement phase to power conversion in the hybrids 110 to 114.

Referring now also to FIG. 7, this drawing schematically shows a 180 degree hybrid coupler 132 with inputs A and B and outputs A+B and A−B. Curves 134 indicate paths from input to output, and associated markings −180 and −360 indicate phase shift or equivalently delay experienced by signals passing along such paths. As shown, paths 134 from A input 1 and B input 2 to A+B Sum output and from A to A−B Diff. output are all associated with −180 degree phase shifts, whereas path 135 from B input 2 to A−B Diff. output is associated with a −360 degree phase shift. A 180 degree phase shift inverts a sinusoidal signal or multiplies it by −1, whereas −360 degree phase shift leaves it unchanged. Hence both signal A and signal B are inverted on passing to the Sum output and are therefore added together, but only signal B is inverted at the Diff. output and is therefore subtracted from A. As will be described later, if two signal vectors of equal magnitude but different phase are both summed and subtracted by a 180 degree hybrid, the resulting sum and difference vectors are at 90 degrees to one another irrespective of the input phase difference. A+B and A−B therefore differ in phase by 90 degrees, which is convenient (but not essential), because it simplifies calculation of antenna element signal phase as will be described later. The hybrids 110 to 114 therefore act as phase to power converters, they convert input signals e.g. (a1.A /b1.B) with equal amplitude but variable relative phase difference into sum and difference output signals with variable power but constant phase difference of 90 degrees. Moreover, the A+B outputs of all three hybrids 110 to 114 are in phase with one another and are at 90 degrees to all three A−B outputs of these hybrids.

The hybrids 110 to 114 have A+B outputs connected to two-way splitters 142c, 142e and 142g respectively, and A−B outputs connected to two-way splitters 142d, 142f and 142h respectively. The splitters 142c to 142h split their input signals into signal fractions c1/c2, d1/d2, e1/e2, f1/f2, g1/g2 and h1/h2 respectively: these fractions are also used as reference indicia for respective splitter outputs, and are for input to respective correspondingly referenced inputs c1 to h2 of fourth to ninth hybrids $144_4$ to $144_9$. The fourth to ninth hybrids $144_4$ to $144_9$ hybrids have A and B inputs 1 and 2 and A+B and A−B sum and difference outputs Sum and Diff., and have the same construction and mode of operation as the first, second and third hybrids 110 to 114. Table 1 below shows which inputs of the fourth to ninth hybrids $144_4$ to $144_9$ receive which signal fractions: here the +/− signs indicate vector addition/subtraction, respectively.

TABLE 1

| Hybrid | Input | Fraction |
|---|---|---|
| $144_4$ | 1 | c1.(a1.A + b1.B) |
| $144_4$ | 2 | d1.(a1.A − b1.B) |
| $144_5$ | 1 | c2.(a1.A + b1.B) |
| $144_5$ | 2 | d2.(a1.A − b1.B) |
| $144_6$ | 1 | e1.(a2.A + b2.B) |
| $144_6$ | 2 | f1.(a2.A − b2.B) |
| $144_7$ | 1 | e2.(a2.A + b2.B) |
| $144_7$ | 2 | f2.(a2.A − b2.B) |

TABLE 1-continued

| Hybrid | Input | Fraction |
|---|---|---|
| $144_8$ | 1 | g1.(a3.A + b3.B) |
| $144_8$ | 2 | h1.(a3.A − b3.B) |
| $144_9$ | 1 | g2.(a3.A + b3.B) |
| $144_9$ | 2 | h2.(a3.A − b3.B) |

The splitters 142c to 142h split their input signals into signal fractions appropriate for addition and subtraction to form antenna element drive signals which vary progressively with antenna element position across the antenna 148. Table 2 below shows which outputs Sum/Diff. of the fourth to ninth hybrids $144_4$ to $144_9$ drive which antenna elements 148U1 to 148L6 via respective fixed phase shifters 146U1 to 144L6. Antenna elements 148U1 to 148U6 in the upper half of the antenna 148 are all driven from sum outputs Sum of the fourth to ninth hybrids $144_4$ to $144_9$, but those in the lower half are driven from difference outputs Diff. of these hybrids. Each of the fourth to ninth hybrids outputs $144_4$ to $144_9$ receives signal contributions originating at either sum or difference outputs of the first to third hybrids 110 to 114 but not from both types of output. Its input signals are therefore in phase with one another. The fourth to ninth hybrids $144_4$ to $144_9$ consequently act as power to phase converters: each converts its two input signals (which have zero phase difference but not necessarily equal amplitude) into sum and difference output signals with phase difference varying between different hybrids but constant power (ignoring any provision for amplitude taper). The arrangement shown allows a progressive phase front to be achieved across the antenna 148 and allows all input power to be used effectively. This ignores the possibility of losses due to dissipation of power in non-ideal components. Excluding such losses, the power distribution network 140 does not generate a signal which cannot contribute usefully to antenna drive signals, so it is not necessary to dispose of some input power inefficiently.

The fourth hybrid $144_4$ drives an outermost pair of antenna elements 148U6 and 148L6. The fifth to ninth hybrids $144_5$ to $144_9$ drive pairs of antenna elements 148U5/148L5, 148U4/148L4, 148U3/148L3, 148U2/148L5 and 148U1/148L1 respectively which are progressively nearer to an antenna centre 150 on which each pair is centred.

Table 2 below shows output signals from the hybrids $144_4$ to $144_9$. The splitter fractions c1 etc. are necessary scalar quantities, but terms in parenthesis in Table 2 column 4, e.g. (a1A+b1.B) and (a1.A−b1.B), are vector additions and subtractions. The phase difference is imposed between Va and Vb as described earlier with reference to FIG. 3 or 4, and vectors are indicated by characters in bold type. Moreover, as previously described, resultants of vector additions (a1.A+b1.B), etc, between signals or equal magnitude are all in phase with one another, and differ in phase by 90 degrees to all vector subtractions (a1.A−b1.B) etc. The vector subtractions are therefore all automatically in quadrature with the vector additions.

TABLE 2

| Antenna Element | Hybrid | Output | Output Signal |
|---|---|---|---|
| 148U6 | $144_4$ | Sum | c1 · (a1 · A + b1 · B) + d1 · (a1 · A − b1 · B) |
| 148U5 | $144_5$ | Sum | c2 · (a1 · A + b1 · B) + d2 · (a1 · A − b1 · B) |
| 148U4 | $144_6$ | Sum | e1 · (a2 · A + b2 · B) + f1 · (a2 · A − b2 · B) |
| 148U3 | $144_7$ | Sum | e2 · (a2 · A + b2 · B) + f2 · (a2 · A − b2 · B) |

TABLE 2-continued

| Antenna Element | Hybrid | Output | Output Signal |
|---|---|---|---|
| 148U2 | $144_8$ | Sum | $g1 \cdot (a3 \cdot A + b3 \cdot B) + h1 \cdot (a3 \cdot A - b3 \cdot B)$ |
| 148U1 | $144_9$ | Sum | $g2 \cdot (a2 \cdot A + b3 \cdot B) + h2 \cdot (a3 \cdot A - b3 \cdot B)$ |
| 148L1 | $144_9$ | Diff. | $g2 \cdot (a3 \cdot A + b3 \cdot B) - h2 \cdot (a3 \cdot A - b3 \cdot B)$ |
| 148L2 | $144_8$ | Diff. | $g1 \cdot (a3 \cdot A + b3 \cdot B) - h1 \cdot (a3 \cdot A - b3 \cdot B)$ |
| 148L3 | $144_7$ | Diff. | $e2 \cdot (a2 \cdot A + b2 \cdot B) - f2 \cdot (a2 \cdot A - b2 \cdot B)$ |
| 148L4 | $144_6$ | Diff. | $e1 \cdot (a2 \cdot A + b2 \cdot B) - f1 \cdot (a2 \cdot A - b2 \cdot B)$ |
| 148L5 | $144_5$ | Diff. | $c2 \cdot (a1 \cdot A + b1 \cdot B) - d2 \cdot (a1 \cdot A - b1 \cdot B)$ |
| 148L6 | $144_4$ | Diff. | $c1 \cdot (a1 \cdot A + b1 \cdot B) - d1 \cdot (a1 \cdot A - b1 \cdot B)$ |

Writing $P_n$ and $Q_n$ for the in-phase and quadrature components of the voltage supplied to the nth upper and lower antenna elements 148Un and 148Ln (n=1 to 6), the phase $\phi_n$ of this voltage is given by:

$$\phi_n = \tan^{-1}\left(\frac{Q_n}{P_n}\right) \quad (2)$$

where $Q_n$ is positive for antenna element 148Un in the upper half of the antenna 148 and negative for antenna element 148Ln in the lower half.

The scalar magnitude $V_n$ of the nth antenna element voltage is given by:

$$V_n = \sqrt{(P_n^2 + Q_n^2)} \quad (3)$$

Splitter ratios in this embodiment of the network 140 are shown in Table 3 below.

TABLE 3

| | | Split Ratio | |
|---|---|---|---|
| Splitter | Splitter Output | Voltage | Decibels |
| 102a | a1 | 0.2286 | −12.8 dB |
| | a2 | 0.7873 | −2.1 B |
| | a3 | 0.5725 | −4.8 dB |
| 102b | b1 | 0.5725 | −4.8 dB |
| | b2 | 0.7873 | −2.1 dB |
| | b3 | 0.2286 | −12.8 dB |
| 142c | c1 | 0.3011 | −10.4 dB |
| | c2 | 0.9536 | −0.4 dB |
| 142d | d1 | 0.7286 | −2.8 dB |
| | d2 | 0.6849 | −3.3 dB |
| 142e | e1 | 0.6112 | −4.3 dB |
| | e2 | 0.7915 | −2.0 dB |
| 142f | f1 | 0.6112 | −4.3 dB |
| | f2 | 0.7915 | −2.0 dB |
| 142g | g1 | 0.7286 | −2.8 dB |
| | g2 | 0.6849 | −3.3 dB |
| 142h | h1 | 0.3011 | −10.4 dB |
| | h2 | 0.9536 | −0.4 dB |

All contributions (e.g. c1.(a1.A+b1.B)) to signals reaching the antenna elements 148U1 to 148L6 from inputs 102a and 102b pass via the same numbers and types of components: i.e. each contribution passes via a path containing a three-way splitter, a hybrid, a two-way splitter, another hybrid and a fixed phase shifter. There is no need for phase padding components, i.e. additional components to correct for differing phase shifts in different paths. The use of two splitters in every path allows splitting ratios to be moderate: this is helpful because as previously described it is desirable for a splitter ratio not to exceed 9.5 dB.

The three-way splitters 106a and 106b primarily set amplitude taper and two-way splitters 142c to 142h primarily set phase taper: here 'taper' means amplitude or phase profile across antenna elements 148U1 to 148L6. The design of the network 140 is symmetrical with repeating blocks of functions, and lends itself to relatively easy optimisation. It is also easily adapted to different numbers of antenna elements in antennas by changing the number of splitters and hybrids. It has relatively few splitters having regard to the number of antenna elements in the array 140.

Figure 8A:
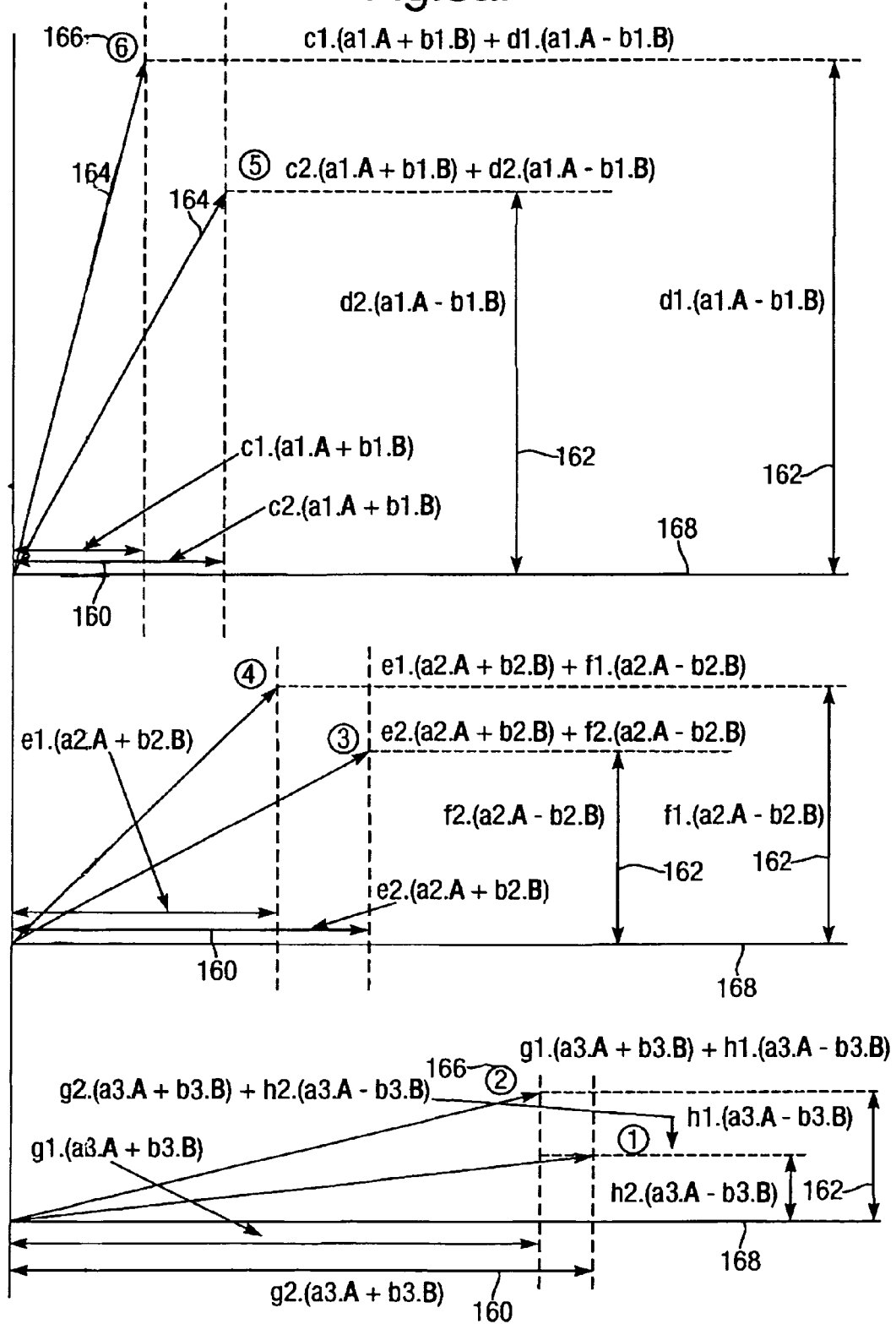
FIGS. 8a and 8b are vector diagrams illustrating phases of antenna element drive signals produced by the FIG. 6 network.

FIG. 8a is a vector diagram of drive signals produced by the network 140 for antenna elements 148U1 to 148U6 in the upper half of the antenna 148: the effects of phase shifters 146U1 to 146L6 have been ignored for convenience. Horizontal, vertical and inclined arrows such as 160, 162 and 164 indicate in-phase components, quadrature components and actual antenna element signal vectors respectively. Encircled numerals 1 to 6 such as at 166 indicate adjacent signal vectors are associated with antenna elements 148U1 to 148U6 respectively. Equivalent vectors (not shown) for drive signals for antenna elements 148L1 to 148L6 in the lower half of the antenna 148 are obtainable by making each vertical arrow 162 extend downwards from horizontal axes 168 instead of upwards, i.e. producing respective mirror images of the signal vectors 164 by reflection in the horizontal axes 168. FIG. 8a shows that the network 140 produces antenna element drive signals with correctly progressive phase across the antenna 148. Optimum performance of the antenna 148 is obtained when a maximum tilt angle is selected corresponding to the maximum allowable side lobe level when tilted. The splitter ratios are then chosen to give a linear phase front for this maximum angle of tilt.

Figure 8B:
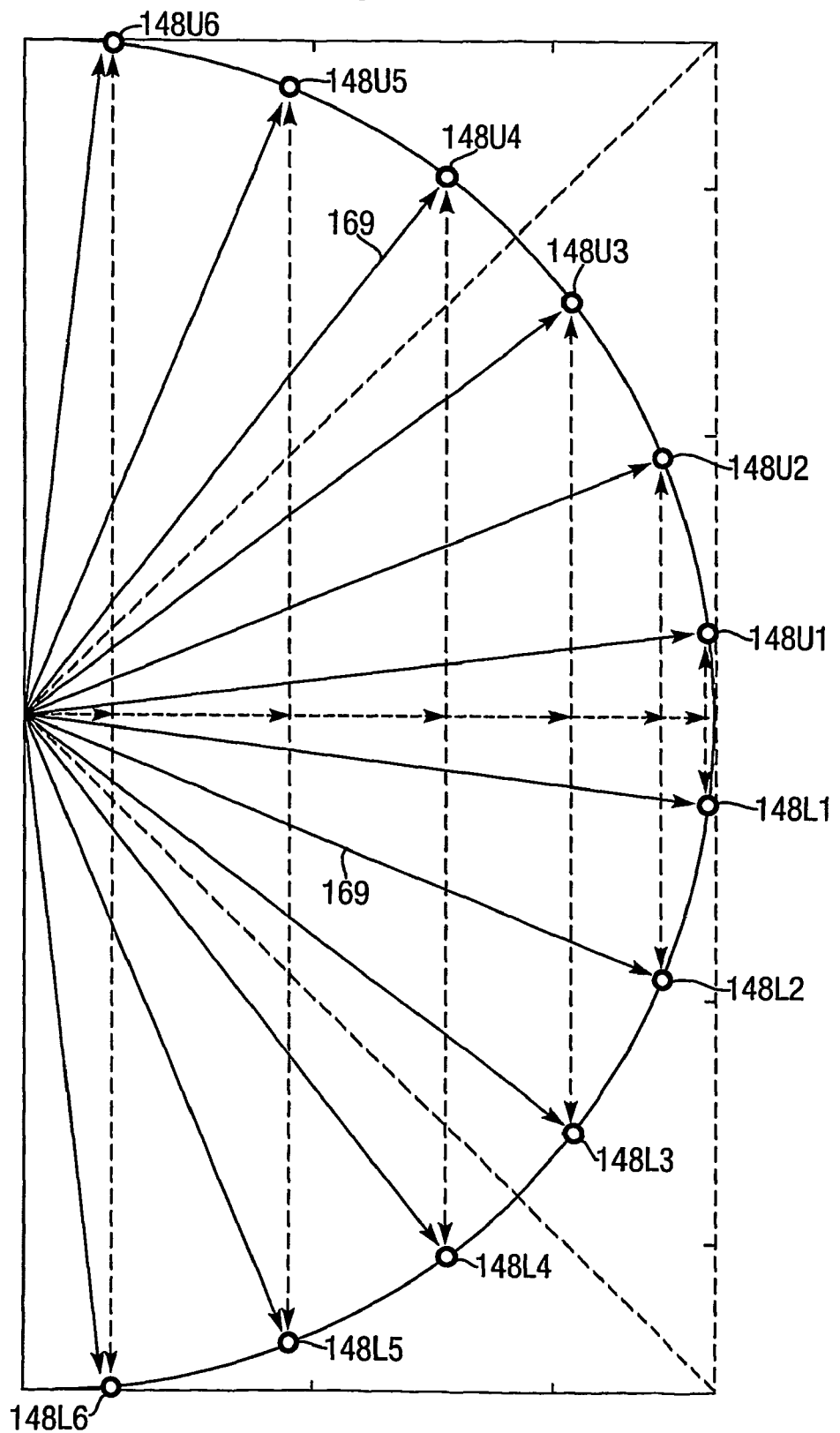
Figure 9:
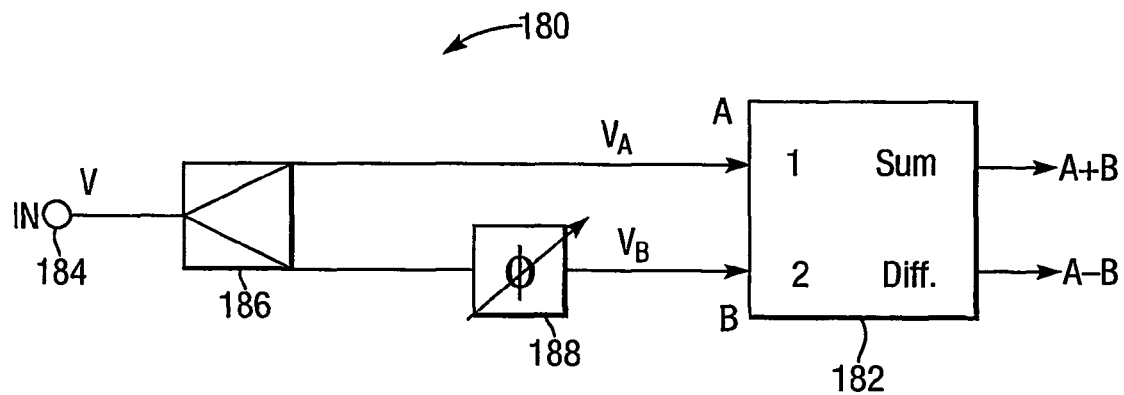
FIG. 9 shows a 180 degree hybrid 182 receiving A and B inputs of two equal amplitude voltages Va and Vb which have a relative phase shift of $\phi$ between them.

FIG. 8b is a full vector diagram corresponding to FIG. 8a but showing antenna element drive signal vectors indicated by solid arrows such as 169 for the whole antenna array 140.

Referring now to FIGS. 9 to 12, FIG. 9 shows an arrangement 180 of a single 180 degree hybrid 182 receiving A and B inputs of two equal amplitude voltages Va and Vb which have a relative phase shift of $\phi$ between them. These voltages are obtained by taking a single voltage V at an input 184, splitting it into two equal voltages at 186 and passing one of the resulting voltages through a variable phase shifter 188. The hybrid 182 generates sum and difference output signals A+B and A−B from input signals A and B.

Figure 10:
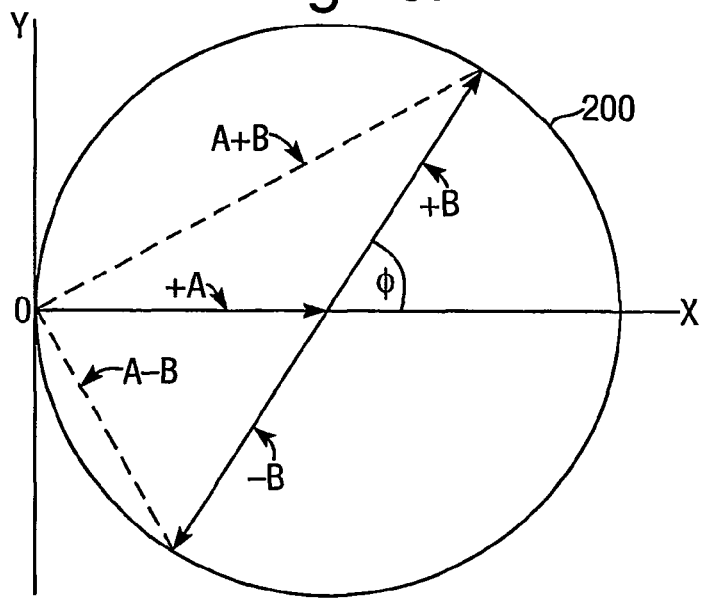
FIG. 10 is a vector diagram of vectors +A, +B, −B, A+B and A−B.

FIG. 10 is a vector diagram of the vectors +A, +B, −B, A+B and A−B, the last two being chain lines. Because A and B are equal, +A, +B and −B can be shown as radii of a circle 200, which is the circumcircle of the triangle of vectors +A, +B and A+B. Being equal and opposite, the vectors +B and −B collectively provide a diameter of the circle 200, and by geometry a diameter subtends a right angle at other points on the circle such as an origin O. However, the vectors A+B and A−B join the origin O to respective ends of the +B/−B diameter, so the vectors A+B and A−B have a right angle between them (or 90 degree relative phase shift) irrespective of the value of the phase difference $\phi$ between +A and +B.

Figure 11:
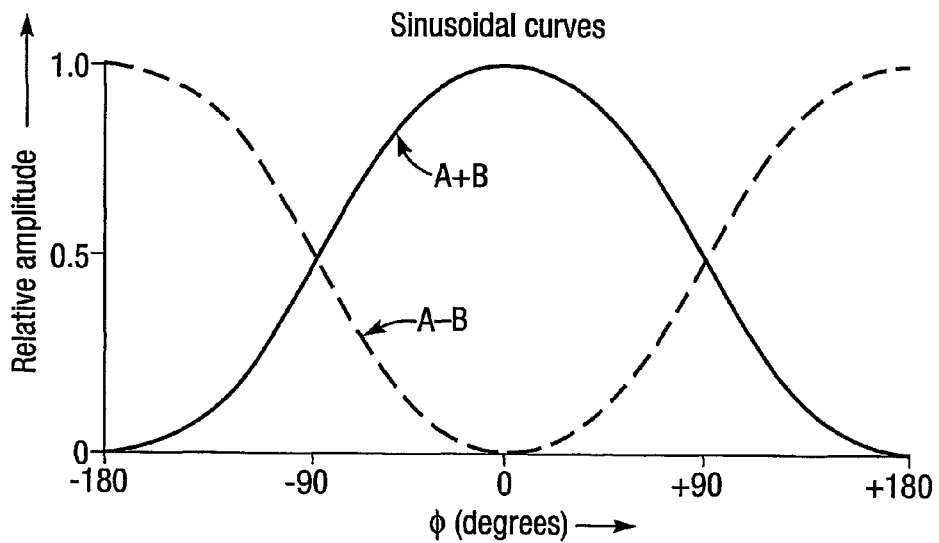
FIG. 11 shows how relative magnitudes of A+B and A−B (chain line) vary as their relative phase difference $\phi$ is adjusted from −180 degrees to 0 to +180 degrees.
Figure 12:
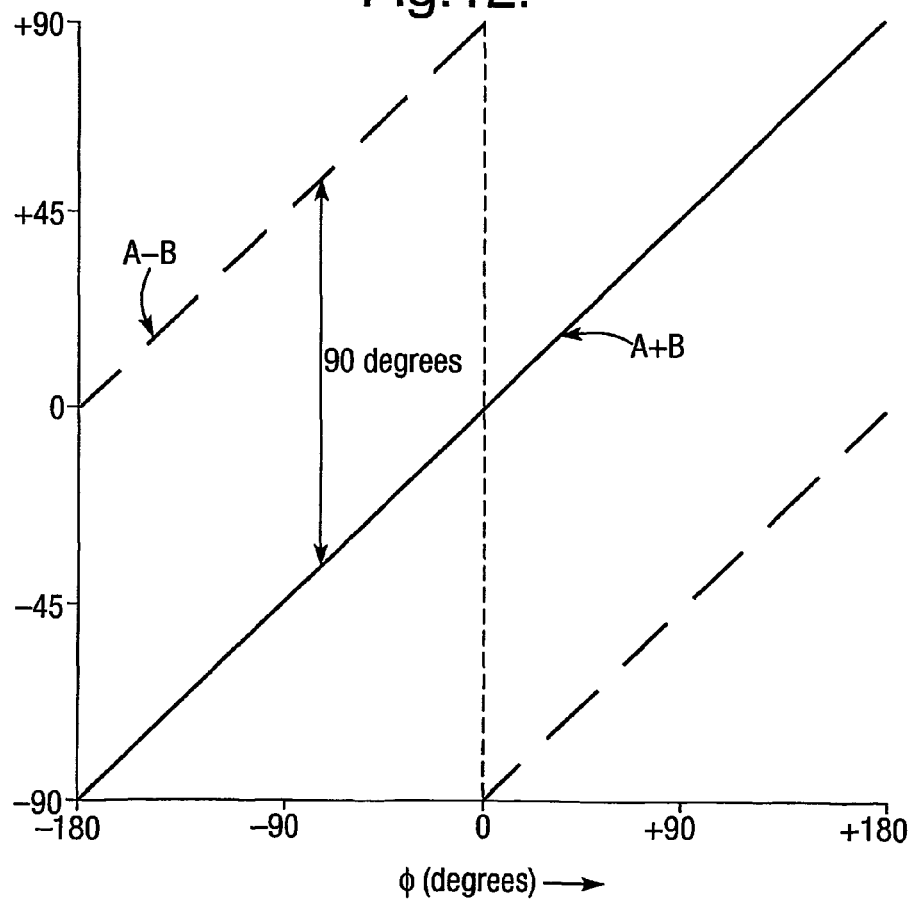
FIG. 12 shows A+B and A−B phase variation as $\phi$ is adjusted from −180 degrees to 0 to +180 degrees.

FIG. 11 shows how the relative magnitudes of A+B and A−B (chain line) vary as their relative phase difference $\phi$ is adjusted from −180 degrees to 0 to +180 degrees: A+B goes sinusoidally from 0 to 1 to 0, and A−B goes cosinusoidally from 1 to 0 to 1. FIG. 12 shows how the phases of A+B and A−B (chain line) vary as $\phi$ is adjusted from −180 degrees to 0 to +180 degrees: A+B goes from −90 degrees to +90 degrees, and A−B goes initially from 0 at $\phi$=−180 degrees to +90 degrees at $\phi$=0, and then abruptly shifts to −90 degrees on passing through 0 and thereafter varies smoothly to 0 at $\phi$+180 degrees.

The invention provides for control of electrical tilt is as follows. As has been said, the drive signal to each antenna element 148U1 etc. in FIG. 6 is a vector which can be written as P+jQ,. When the phase difference between the input vectors A and B (or voltages Va and Vb) is zero, i.e. φ=0, the difference output A–B from all hybrids 110 etc. is also zero, as shown in FIG. 11. Thus when the antenna is not tilted the drive signals to all antenna elements 148U1 etc. have the same phase, the 'untilted' phase, and Q=0 in P+jQ.

When the phase difference between the A and B vectors increases, FIG. 11 shows that the difference outputs from the hybrids increase while the sum outputs decrease. The value of Q therefore increases while the value of P decreases. Thus the phase angles of the drive signals to each antenna element 148U1 etc. change. A progressively increasing phase front across the antenna elements is achieved by having progressively smaller values for P for antenna elements (e.g. 148U1/148L1) progressively nearer the centre line 150, and progressively larger values for P for antenna elements (e.g. 148U6/148L6) progressively further from the centre line 150. A proportion of antenna drive power is therefore transferred from the centre of the antenna 148 to its ends. This is achieved by appropriate connection of the outputs of the hybrids 110 to 114.

Thus in FIG. 5 the central hybrid 112 of the first, second and third hybrids feeds antenna elements 124U2 and 124L2 that are half way between an antenna centre shown as a dotted line and end elements 124U3/124L3 of the antenna 124, while the other two leftmost hybrids, 110 and 114, each have A–B difference outputs "exchanged", i.e. connected to a fourth or sixth hybrid 116 or 120 which receives the other (114 or 110) hybrid's A+B output. This arrangement moves in-phase power (P vector component) from the centre to the ends of the antenna 124 achieving a progressive phase front.

FIG. 11 shows that the phase of hybrid difference outputs changes by 180 degrees depending on whether the phase difference between the vectors A and B is positive or negative. This ensures that a progressive phase front exists across the antenna whether the antenna is tilted upwards or downwards.

The embodiments of the invention described use 180 degree hybrids. They may be replaced by e.g. 90 degree 'quadrature' hybrids with the addition of 90 degree phase shifters to obtain the same overall functionality, but this is less practical.

The examples of the invention described with reference to FIGS. 3 to 12 were discussed in terms of operation in transmission. However, all components are reversible and those examples can also operate as receivers. Hybrids and phase shifters are reversible, and splitters in reverse become recombiners as required in reception.

The invention claimed is:

1. A phased array antenna system with controllable electrical tilt including:
   a) an antenna with multiple antenna elements;
   b) apparatus for providing two basis signals with variable relative delay therebetween,
   c) splitting apparatus for dividing the basis signals into signal components,
   d) phase to power converting apparatus for converting the signal components into transformed components having powers which vary as the relative delay varies, and
   e) power to phase converting apparatus for converting the transformed components into antenna element drive signals having phases which vary from antenna element to antenna element progressively across the antenna when the antenna is electrically tilted and which individually vary as the relative delay varies.

2. A system according to claim 1 wherein the phase to power converting apparatus comprises a plurality of hybrid radio frequency coupling devices ("hybrids") for providing sums and differences of pairs of signal components, each pair having signal components from both basis signals.

3. A system according to claim 1 wherein the phase to power converting apparatus comprises a plurality of 180 degree hybrids for providing sums and differences of pairs of signal components, each pair having signal components from both basis signals.

4. A system according to claim 3 wherein each pair has signal components of equal magnitude, but each pair's component magnitude is not equal to that of another pair.

5. A system according to claim 3 wherein the hybrids are first hybrids and the power to phase converting apparatus incorporates a plurality of second hybrids arranged to generate antenna element drive signals.

6. A system according to claim 5 wherein the splitting apparatus is a first splitting apparatus and the power to phase converting apparatus incorporates a second splitting apparatus for dividing the sums and differences into components for input to the second hybrids.

7. A system according to claim 6 wherein the first splitting apparatus is for dividing each of the basis signals into three signal components.

8. A system according to claim 6 wherein the second splitting apparatus is a plurality of two-way splitters.

9. A system according to claim 1 wherein all paths extending from basis signal provision to antenna elements contain the same numbers and types of components.

10. A method of controlling electrical tilt of a phased array antenna system including an antenna with multiple antenna elements, and wherein the method incorporates the steps of:
    a) providing two basis signals with variable relative delay therebetween,
    b) splitting the basis signals into signal components,
    c) converting the signal components into transformed components having powers which vary as the relative delay varies, and
    d) converting the transformed components into antenna element drive signals having phases which vary from antenna element to antenna element progressively across the antenna when the antenna is electrically tilted and which individually vary as the relative delay varies.

11. A method according to claim 10 wherein step c) is implemented using a plurality of hybrids for providing sums and differences of pairs of signal components, each pair having signal components from both basis signals.

12. A method according to claim 10 wherein step c) is implemented using a plurality of 180 degree hybrids providing sums and differences of pairs of signal components, each pair having signal components from both basis signals.

13. A method according to claim 12 wherein each pair has signal components of equal magnitude, but each pair's component magnitude is not equal to that of another pair.

14. A method according to claim 12 wherein the hybrids are first hybrids and step d) is implemented using a plurality of second hybrids for generating the antenna element drive signals.

15. A method according to claim 14 wherein splitting in step b) is a first splitting and a second splitting is implemented in step d) to divide the sums and differences into components for input to the second hybrids.

16. A method according to claim 15 wherein the first splitting divides each of the basis signals into three signal components.

17. A method according to claim 15 wherein the second splitting is a plurality of two-way splits.

18. A method according to claim 10 including supplying antenna element drive signals to antenna elements via paths extending from basis signal provision and containing the same numbers and types of components.

19. A phased array antenna system with controllable electrical tilt including:
an antenna with multiple antenna elements;
apparatus for providing first and second basis signals with variable relative delay therebetween,
splitting apparatus for dividing the first basis signal into first signal components and the second basis signal into second signal components,
phase to power converting apparatus for converting pairs of signal components into transformed components having powers which vary as the relative delay varies, each pair of signal components being a respective first signal component and a respective second signal component, and
power to phase converting apparatus for converting the transformed components into antenna element drive signals having phases which vary from antenna element to antenna element progressively across the antenna when the antenna is electrically tilted and which individually vary as the relative delay varies.

20. A method of controlling electrical tilt of a phased array antenna system including an antenna with multiple antenna elements, and wherein the method incorporates the steps of:
providing first and second basis signals with variable relative delay therebetween,
splitting the first basis signal into first signal components and the second basis signal into second signal components,
converting pairs of signal components into transformed components having powers which vary as the relative delay varies, each pair of signal components being a respective first signal component and a respective second signal component, and
converting the transformed components into antenna element drive signals having phases which vary from antenna element to antenna element progressively across the antenna when the antenna is electrically tilted and which individually vary as the relative delay varies.

* * * * *

UNITED STATES PATENT AND TRADEMARK OFFICE
CERTIFICATE OF CORRECTION

PATENT NO. : 7,420,507 B2  Page 1 of 1
APPLICATION NO. : 10/577206
DATED : September 2, 2008
INVENTOR(S) : Thomas et al.

It is certified that error appears in the above-identified patent and that said Letters Patent is hereby corrected as shown below:

Title page item (22), delete "Oct. 26, 2004" and replace with -- Oct. 29, 2004 --.

Signed and Sealed this

Tenth Day of March, 2009

JOHN DOLL
*Acting Director of the United States Patent and Trademark Office*